US006999447B2

(12) United States Patent
D'Amico et al.

(10) Patent No.: US 6,999,447 B2
(45) Date of Patent: Feb. 14, 2006

(54) VOIP TRANSMITTER AND RECEIVER DEVICES AND METHODS THEREFOR

(75) Inventors: Thomas Victor D'Amico, Palatine, IL (US); Paul Edward Gorday, West Palm Beach, FL (US); Spyros Kyperountas, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 574 days.

(21) Appl. No.: 10/180,256

(22) Filed: Jun. 26, 2002

(65) Prior Publication Data

US 2004/0001477 A1    Jan. 1, 2004

(51) Int. Cl.
*H04L 12/66* (2006.01)
*H04L 12/28* (2006.01)
*H04B 7/216* (2006.01)

(52) U.S. Cl. .................. 370/349; 370/352; 370/516
(58) Field of Classification Search ............... 370/349, 370/352, 465, 516, 517
See application file for complete search history.

(56) References Cited

U.S. PATENT DOCUMENTS

| 6,259,677 B1 * | 7/2001 | Jain .......................... 370/252 |
| 6,434,139 B1 * | 8/2002 | Liu et al. .................. 370/352 |
| 6,466,550 B1 * | 10/2002 | Foster et al. ............... 370/261 |
| 6,693,899 B1 * | 2/2004 | Makridakis ................ 370/356 |
| 6,788,651 B1 * | 9/2004 | Brent et al. ................ 370/255 |

OTHER PUBLICATIONS

Nanda, Sanjiv et al., Bell Labs, Lucent Technologies, "Adaption Techniques in Wireless Packet Data Services," IEEE Communications Magazine, Jan. 2000, pp. 54-64.

* cited by examiner

*Primary Examiner*—Chau Nguyen
*Assistant Examiner*—Soon D. Hyun
(74) *Attorney, Agent, or Firm*—Sylvia Chen

(57) ABSTRACT

A Voice Over Internet Protocol (VOIP) receiver (630), operating in conjunction with a transmitter (606) receives a sequence of voice packets representing a speech utterance transmitted over a VOIP wireless interface (112). A receive packet buffer (120) buffers the received sequence of voice packets after receipt and before playback of reconstructed speech. A processor (650), operating under program control, determines a transmission buffer (108) delay of a first packet in the sequence of packets representing the speech utterance. The control processor (650) further sets a prescribed amount of delay in the receive packet buffer (120) based upon the transmission buffer (108) delay so that the transmission buffer delay+receive buffer delay=a predetermined total delay. The status of the receiver buffer (120) is monitored and tracked by or fed back to the transmitter side to minimize receive buffer (120) under-runs by use of CDMA soft capacity (200), link dependent prioritization (300), real-time packet prioritization (400) and/or variation of vocoder (624) rates (500).

43 Claims, 3 Drawing Sheets

VOIP TRANSMITTER AND RECEIVER DEVICES AND METHODS THEREFOR

FIELD OF THE INVENTION

This invention, in certain embodiments, relates generally to the field of VOIP (Voice over Internet Protocol) applied to a wireless communication system. More particularly, in certain embodiments, this invention relates to a buffering arrangement and system control mechanism to enhance performance of VOIP on a CDMA (Code Division Multiple Access) system.

BACKGROUND OF THE INVENTION

The Internet Protocol (IP) is a protocol that defines the addressing of packets of information that can be transmitted over the Internet. Generally, the Internet Protocol establishes the nature and length of the packets and provides addressing information used by the various switches and routers to direct each individual packet to its intended destination. Voice Over IP (VOIP) is the technology used to transmit voice messages over a data network using the Internet Protocol.

With the evolution of the Internet has come a wave of technology that can be used to carry voice information in packetized form using the Internet Protocol (IP). Several services have been established commercially to provide such communication using the Internet and/or commercial networks as a vehicle to provide free or reduced price telephone service. Such service is attractive since it permits management of a single data network to handle both voice and data. Moreover, since the voice and data are integrated within a single network using a single protocol, additional features and services have been contemplated. Unfortunately, many obstacles have presented themselves to providing quality service using VOIP over the conventional wired Internet. Much of the problem relates to a user's low tolerance for delay in voice communication.

With the boom in popularity of cellular telephone communication, and the expansion in functionality of cellular telephones to act as terminal devices for utilizing services of the Internet, there is also a desire to achieving real time speech quality utilizing VOIP within a cellular telephone system. This environment also presents challenges due to a low tolerance for delay of speech signals and variation in signal strength. If too much delay is encountered, the speech output may sound disjointed and unnatural and perhaps even unintelligible. Such delays become a greater problem as traffic loading on the wireless network increases. Contention for the available bandwidth can be reduced by minimizing traffic loading on the network to assure that there are no delays in broadcasting of voice packets, but this, of course, wastes valuable bandwidth, that is more cost effective when nearly fully utilized.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
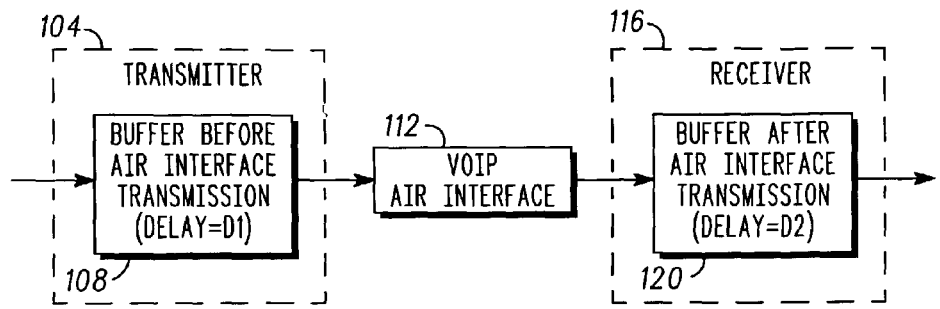
FIG. 1 is a block diagram of a transmitter and receiver pair with associated buffers consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Turning now to FIG. 1, a block diagram of a transmitter and receiver pair used in a CDMA VOIP system with associated buffers consistent with certain embodiments of the present invention is illustrated. In a two-way communication VOIP CDMA system, a transmitter and a receiver is present at each end, but for simplification, consider only a single transmitting and receiving pair for now. Transmitter 104 incorporates a buffer 108 with a variable delay designated D1 in the digital signal path that is controlled in a manner as will be described later. This buffer 108 can be at any suitable location within the digital signal path prior to wireless transmission over a VOIP air interface 112. At the receiver end, a receiver 116 incorporates a second buffer 120 that has a variable associated delay designated D2.

Within any packetized data system, a short fixed delay can be tolerated without being noticeable to users of the system. Delays that are roughly on the order of 100 ms can be tolerated without the user noticing. In accordance with the present invention, a fixed delay, e.g., 100 ms, is established and maintained in the system using a number of different mechanisms as will be described later. This fixed delay is divided between the two delays D1 and D2 so that D1+D2=Fixed delay=100 ms in this embodiment.

By fixing this total delay, gaps in voice utterances can be avoided and the fixed delay can be used to smooth the voice by permitting time for receipt of all packets needed to assemble the voice utterances. This delay permits the system to smooth out and deal with simultaneous transmission of packets from numerous sources and permit the overall traffic on the system to be optimized toward maximal loading without detrimental effects on speech quality.

As previously stated, overall delay is split between buffer 108 and buffer 120 on each side of the air interface 112. Since the total delay remains constant at (100 ms in the preferred embodiment), the amount of time that a packet is to be delayed at the receiver side buffer 120 is attached to the first packet of each utterance. Alternatively, the information attached to the first packet of an utterance can be (1) the amount of time the packet has already been delayed prior to transmission (and thus the delay can be derived at the receiver side), (2) an absolute time stamp indicating when the packet should be utilized based on synchronized time references on each side of the air interface (and thus the delay can be derived at the receiver side), or (3) any other information that conveys the amount of delay required at the receiver buffer 120 to achieve the constant overall delay. In the preferred embodiment, the delay is initially set to zero at buffer 108 and set to 100 ms at buffer 120 if the instantaneous loading permits immediate transmission of the first packet of the utterance. Thereafter and as conditions dictate, further adjustments are made. Other initial delays are utilized as a function of instantaneous loading.

Thus, in accordance with certain embodiments of the present invention, if the start of an utterance is delayed by 60 ms at transmission, the first packet of the utterance conveys to the receiver that it should be buffered by 40 ms. Subsequent packets carrying subsequent portions of the utterance are stacked up in the buffer as received for playback in order with no delay between adjacent packets. This permits the playback of the packets at the receiver to be smooth and without gaps.

At any given time, the CDMA network may be carrying multiple voice communications using VOIP simultaneously. Accordingly, at indeterminate times, bursts of packets may be transmitted simultaneously in a manner that produces an instantaneous overload of the system. The transmitter 104, if located at a base station site, can adjust the buffer 108's delay to temporarily adjust for the heavy load. A heavier traffic load can also be accommodated by using the so called "soft capacity" of the CDMA system to briefly increase the system capacity, albeit at the sacrifice of the system's overall Signal/(Interference+Noise) ratio (S/I+N) and thus potentially the bit error rate of the system.

Figure 2:
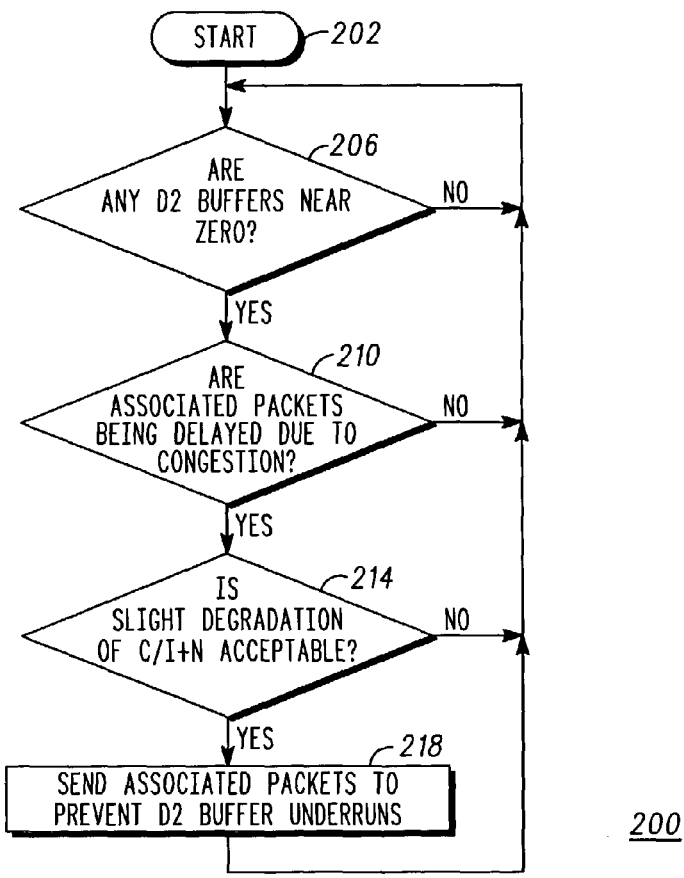
FIG. 2 is a flow chart of a method for use of CDMA soft capacity to prevent gaps in VOIP voice transmission consistent with certain embodiments of the present invention.

FIG. 2 illustrates a method 200 for monitoring and adjusting the soft capacity of the system to accommodate instantaneous excess packet transmission needs starting at 202. This method assumes that the status of D2 buffers 120 is tracked (or alternatively fed back) and analyzed at the associated transmitter 104. Transmitter 104, using internal processing capabilities, then determines at 206 if there are any D2 buffers 120 that are near zero delay. Near zero can be defined as a delay less than a predetermined threshold, e.g. 5 ms in the current example. If not, no action is taken. If so, a determination is made as to whether the delays are due to congestion at 210. If not, no action is taken. If so, a determination is made as to whether a slight temporary degradation of S/I+N is acceptable to overcome the current congestion. If not, no action is taken. If so, the associated packets are sent to prevent D2 buffer 120 under-runs at 218. Control then returns to 206 and the status of the D2 buffers 120 is continuously monitored to determine the need for adjustment in the soft capacity of the system. This method can be used in conjunction with other methods that do not impact the overall system's performance and can thus be balanced using prioritization arrangement in conjunction with other techniques.

Figure 3:
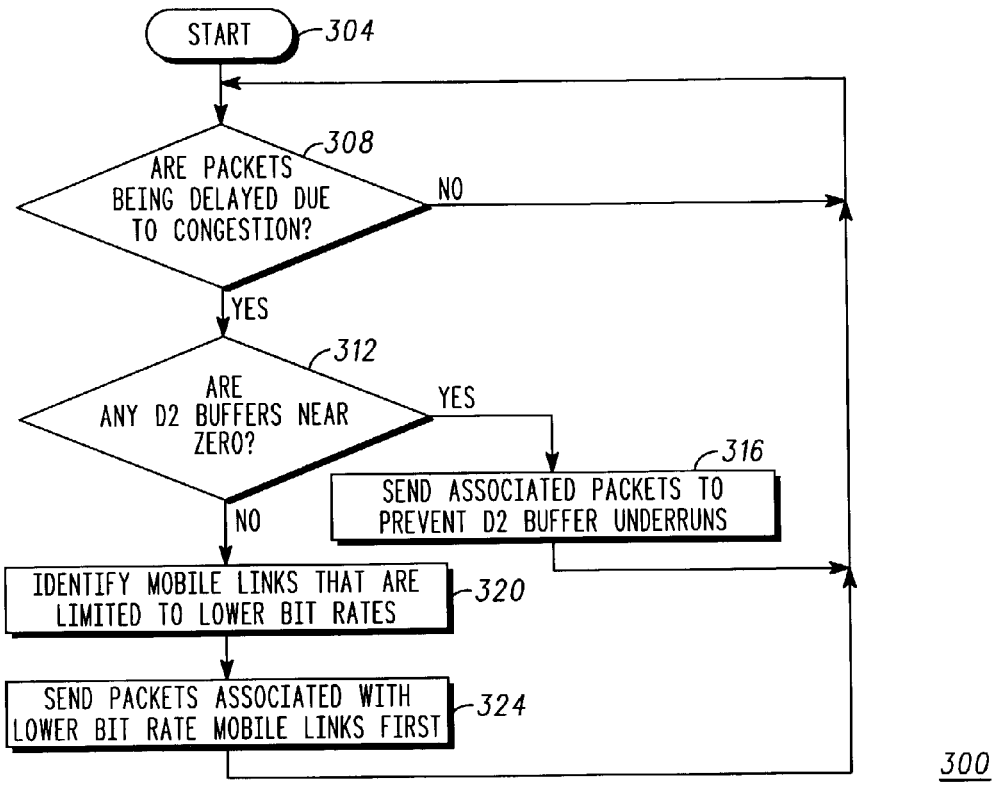
FIG. 3 is a flow chart of a method of link dependent prioritization of packet transmissions consistent with certain embodiments of the present invention.

Another technique that can be used to assist in balancing the buffer delays is illustrated in FIG. 3 as process 300 starting at 304. In this technique, priority is given to links that are limited to lower bit rates and packets to links capable of higher bit rates are delayed. In a CDMA system, coverage area is maximized by permitting mobile transceivers at the edge of a coverage area (or otherwise in an area exhibiting a poor quality communication link) to operate with a bit rate equal to the vocoder rate. Mobile transceivers that are closer to the center of a cell (or otherwise have a higher quality communication link) are permitted to operate at higher bit rates.

In accordance with process 300, whenever packets are being delayed due to congestion at 308, a determination is made as to whether or not there are any D2 buffers 120 near zero at 312. If so, associated packets are sent to prevent D2 buffer 120 under-runs at 316. If not, at 320 mobile links are identified that are limited to lower bit rates due to the quality of their link. Packets are then prioritized at 324 so that packets to lower bit rate receivers are sent with higher priority than packets destined for receivers with higher quality links. Any number of techniques can be used to monitor the quality of a particular link. It is common to use pilot strength measurements in CDMA systems as an indicator of a link's quality. The quality of the link may be determined, for example, by reference to standard PSMM (Pilot Strength Measurement Messages) or SCRM (Supplemental Channel Request Messages) for CDMA2000 (a defined standard for CDMA communications). Any other suitable technique for determining link quality may also be equivalently used without limitation.

Figure 4:
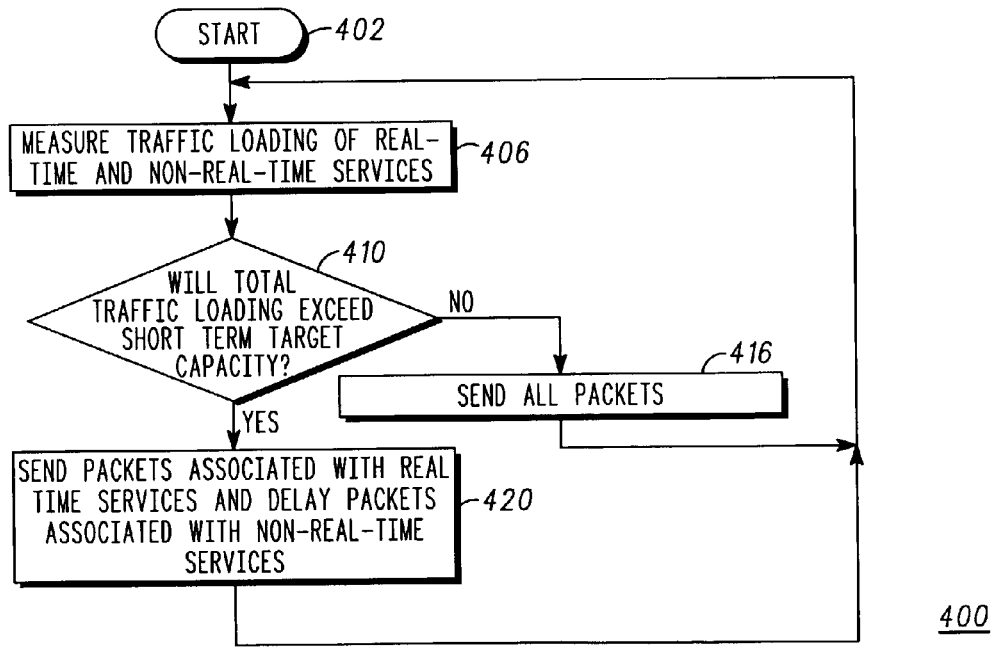
FIG. 4 is a flow chart of a method of prioritization of real-time and non-real-time services in a packet system consistent with certain embodiments of the present invention.

FIG. 4 illustrates another technique 400 that can be used to assist in balancing the buffers 108 and 120, starting at 402. This technique assumes that the system in question carries a mixture of real time data and non-real time data. By way of example, and not limitation, cellular telephone voice communication is a real-time service, whereas transmission of email, web pages, stock quotes, sports scores and other services may not be quite as time critical. Accordingly, process 400 prioritizes real-time service related packets over non-real-time related packets. At 406, the traffic loading of real-time and non-real-time packets is measured. At 410, a determination is made as to whether the total traffic loading (real-time plus non-real-time) exceeds a short-term target capacity (which is variable for any given network). If not, all packets are sent at 416. If so, packets associated with non-real-time services are delayed at 420 in favor of real-time services related packets. Control then returns to 406 and the process repeats (from either 416 or 420).

Figure 5:
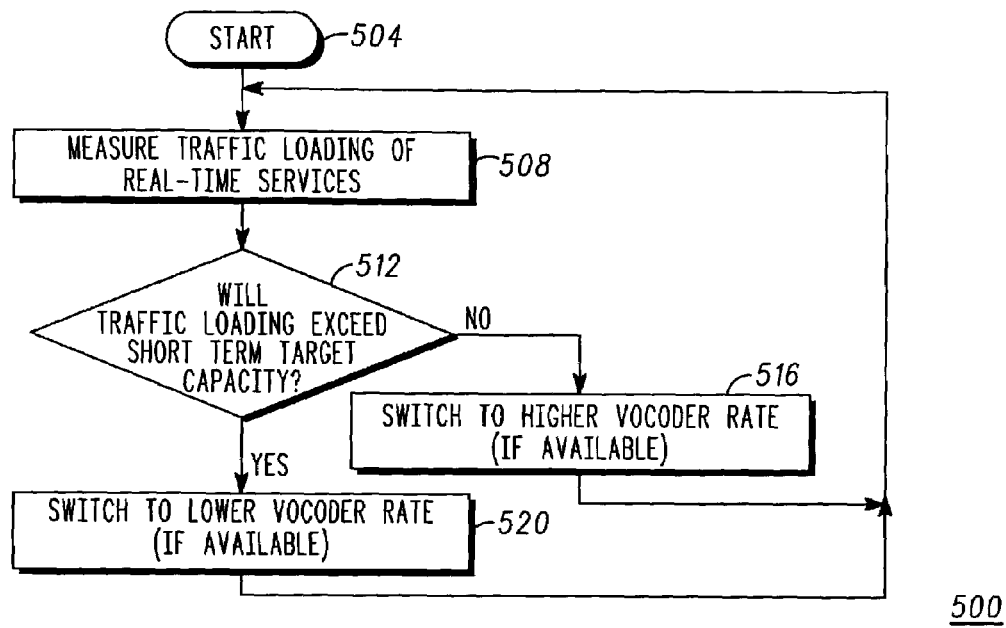
FIG. 5 is a flow chart depicting use of variable vocoder rates in a CDMA VOIP system consistent with certain embodiments of the present invention.

FIG. 5 illustrates a further process 500 for use of variable vocoder rates to assist in balancing the delays at buffers 108 and 120 starting at 504. At 508, the traffic loading for real-time services is measured. If the traffic loading does not exceed short-term targets for capacity at 512, the system switches to a higher vocoder rate (if available) at 516 and the process returns to 508. If the traffic loading does exceed short-term targets for capacity at 512, the vocoder rate is switched to a lower rate (if available). Control then returns to 508 for continuous monitoring of the traffic loading.

FIGS. 2–5 above provide four separate techniques that can be used in conjunction with the dual buffering technique described above to help ensure that there are no undesirable gaps in the reproduction of speech utterances in a VOIP system using CDMA. Any or all of these techniques can be utilized as desired to assist in balancing the buffers. Those skilled in the art will appreciate that many variations of these four techniques are possible without departing from the present invention.

Figure 6:
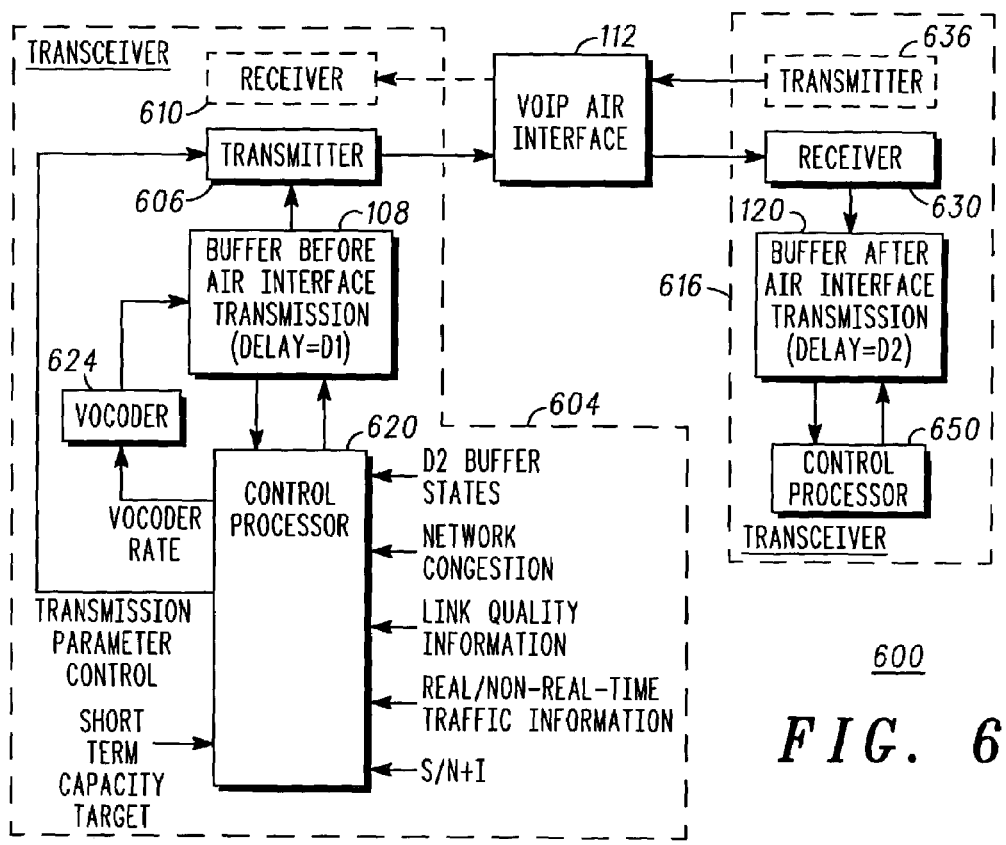
FIG. 6 illustrates a block diagram of a transceiver pair consistent with certain embodiments of the present invention.

Turning now to FIG. 6, a more detailed block diagram of a transceiver pair used in a CDMA VOIP system with associated buffers consistent with certain embodiments of the present invention is illustrated. In a two-way communication VOIP CDMA system, a transmitter and a receiver is present at each end. This is illustrated in a transceiver 604 coupled to transceiver 616. Transceiver 604 (operating as the transmitting side) incorporates a transmitter 606 and a receiver 610. (Note that the voice buffer and other blocks associated with receiver 610 are not shown in the diagram for simplicity.) Transceiver 604 also incorporates buffer 108 with a variable delay designated D1 in the digital signal path that is controlled by a control processor 620. This buffer 108 receives VOIP format packets of voice from vocoder 624. Vocoder 624 operates with its rate controlled by processor 620. In accordance with one embodiment consistent with the present invention, processor 620 encodes the first packet of an utterance with an indication of the delay D1 of buffer 108 and that packet is transmitted along with the other packets making up the utterance over the VOIP air interface 112 to transceiver 616. Control processor 620 receives input regarding (or alternatively tracks) the D2 buffer states of transceiver 616 as well as other receivers, information regarding network congestion, link quality information, real-time and non-real time traffic information and overall system C/N+I information. The control processor 620 is also programmed with short-term network capacity targets and other information.

At the transceiver 616 (illustrated operating as the receiver side), a receiver 630 is coupled to buffer 120 that has variable delay D2. The state of the link quality, status of D2 and other information can be fed back to transceiver 604 via transmitter 636 through air interface 112 to receiver 610. (Note again that the voice buffer and other blocks associated with transmitter 636 are not shown for simplicity.) A control processor 650 at transceiver 616 operates in a manner similar to that of processor 620 in transmission mode and in receive mode receives the first packet in an utterance, decodes the value of D1 and calculates the amount of initial delay required to maintain a fixed delay for D1+D2. Alternatively, control processor 620 can make that calculation and transmit the initial value of D2 along with the first packet in an utterance (either as part of that packet or as a separate control packet).

Thus, a VOIP receiver, consistent with certain embodiments of the present invention has a receiver that receives a sequence of voice packets representing a speech utterance transmitted over a VOIP wireless interface. A receive packet buffer buffers the received sequence of voice packets after receipt and before playback of reconstructed speech. A processor determines an initial transmission buffer delay of a first packet in the sequence of packets representing the speech utterance and sets a prescribed initial amount of delay in said receive packet buffer based upon the transmission buffer delay so that the initial transmission buffer delay+initial receive buffer delay=a predetermined total delay under control of a control program. Alternatively, the processor can simply read an initial receive buffer delay that has already been calculated at the transmission side, and set the receive buffer delay accordingly.

A Voice Over Internet Protocol (VOIP) transmitter consistent with certain embodiments of the present invention has a transmission buffer that buffers a plurality of packets, the transmission buffer having a transmission buffer delay. A sequence of packets is received that encodes a speech utterance using VOIP. A transmitter transmits an initial buffer delay value along with a first packet in the sequence of packets that encode the speech utterance over a wireless CDMA network. In certain embodiments, the initial buffer delay value is the initial transmitter buffer delay value, and in other embodiments, the initial buffer delay value is the initial receiver buffer delay value. The overall delay is predetermined and is equal to the receive buffer delay value+the transmitter buffer delay value.

In the above system 600, any or all of the measures described in connection with FIGS. 2–5 can be implemented to assist in assuring that there are no gaps in the packetized voice as described. Thus, the status of the receiver buffer 120 is monitored by (tracked or alternatively fed back to) the transmitter side to minimize receive buffer 120 under-runs by use of CDMA soft capacity 200, link dependent prioritization 300, real-time packet prioritization 400 and/or variation of vocoder rates 500.

Those skilled in the art will recognize that the present invention has been described in terms of exemplary embodiments based upon use of a programmed processor such as 620 and 650 residing at the transmitter and/or receiver site (generally the same, since the invention is particularly directed to systems having two transceivers in two way communication). Such processor may be any suitable general purpose or special purpose processor such as the commercially available processors made by Motorola, Inc. and others. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

The present invention, as described in embodiments herein, is implemented using a programmed processor such as 620 or 650 executing programming instructions that are broadly described above in flow chart form that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error control can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A Voice Over Internet Protocol (VOIP) transmitter device, comprising:
   a transmission buffer that buffers a plurality of packets, the transmission buffer having a transmission buffer delay;
   means for receiving a sequence of packets that encode a speech utterance using VOIP; and
   means for transmitting an initial buffer delay value along with a first packet in the sequence of packets that encode the speech utterance over a wireless network.

2. The apparatus according to claim 1, further comprising:
   a vocoder that digitally encodes speech signals at a specified vocoder rate; and
   means for adjusting the vocoder rate based upon a measure of traffic loading of the wireless network.

3. The apparatus according to claim 2, wherein the vocoder rate is increased if traffic loading does not exceed a short-term target capacity and the vocoder rate is decreased if traffic loading exceeds said short-term target capacity.

4. The apparatus according to claim 1, further comprising:
   means for determining real-time and non-real-time traffic loading on the wireless network;
   means for prioritizing real-time traffic higher than non-real-time traffic if a measure of traffic loading exceeds a short term traffic loading capacity target.

5. The apparatus according to claim 1, wherein the wireless network comprises a Code Division Multiple Access (CDMA) wireless network.

6. The apparatus according to claim 5, further comprising:
   means for monitoring values of receive buffer delays for receivers operating on the wireless CDMA network;
   means for determining a congestion level of the wireless CDMA network;
   means for determining if a short term degradation of the wireless CDMA network's overall performance as measured by carrier/(noise+interference) is acceptable; and
   if the receive buffer delays are smaller than a predetermined threshold, and if the congestion level is greater than a predetermined threshold and if a degradation of the wireless CDMA network's overall performance is acceptable, then increasing the wireless CDMA network's soft capacity to increase throughput of transmitted packets.

7. The apparatus according to claim 5, further comprising:
   means for monitoring values of receive buffer delays for receivers operating on the wireless CDMA network;
   means for determining a congestion level of the wireless CDMA network;
   means for identifying bit rates of links on the wireless CDMA network; and
   means for prioritizing communications with links based upon the bit rates of the links such that the lower the low bit rate, the higher the priority.

8. The apparatus according to claim 1, further comprising a vocoder that encodes speech utterances into said sequence of packets.

9. The apparatus according to claim 1, wherein the initial buffer delay value comprises the initial transmission buffer delay value.

10. The apparatus according to claim 1, wherein the initial buffer delay value comprises the initial receive buffer delay value.

11. The apparatus according to claim 1, wherein the initial receive buffer delay value=a predetermined delay value–the initial transmission buffer delay value.

12. The apparatus according to claim 1, wherein the initial buffer delay value comprises an absolute time stamp that enables derivation of the initial receive buffer delay value.

13. A Voice Over Internet Protocol (VOIP) transmitter device, comprising:
    a transmission buffer that buffers a plurality of packets, the transmission buffer having a transmission buffer delay;
    means for receiving a sequence of packets that encode a speech utterance using VOIP; and
    a transmitter that transmits an initial buffer delay value along with a first packet in the sequence of packets that encode the speech utterance over a wireless CDMA network.

14. The apparatus according to claim 13, further comprising:
    a vocoder that digitally encodes speech signals at a specified vocoder rate; and
    a programmed control processor operating under program control to adjust the vocoder rate based upon a measure of traffic loading of the CDMA wireless network.

15. The apparatus according to claim 14, wherein the vocoder rate is increased if traffic loading does not exceed a short-term target capacity and the vocoder rate is decreased if traffic loading exceeds said short-term target capacity.

16. The apparatus according to claim 13, further comprising:
    means for determining real-time and non-real-time traffic loading on the wireless network;
    a control processor operating under program control to prioritize real-time traffic higher than non-real-time traffic if a measure of traffic loading exceeds a short term traffic loading capacity target.

17. The apparatus according to claim 13, further comprising:
    means for monitoring values of receive buffer delays for receivers operating on the wireless CDMA network;
    a programmed processor carrying out programmed instructions to:
      determine a congestion level of the wireless CDMA network;
      determine if a short term degradation of the wireless CDMA network's overall performance as measured by carrier/(noise+interference) is acceptable; and
      if the receive buffer delays are smaller than a predetermined threshold, and if the congestion level is greater than a predetermined threshold and if a degradation of the wireless CDMA network's overall performance is acceptable, then increase the wireless CDMA network's soft capacity to increase throughput of transmitted packets.

18. The apparatus according to claim 13, further comprising:
    means for monitoring values of receive buffer delays for receivers operating on the wireless CDMA network;
    a programmed processor carrying out programmed instructions to:
      determine a congestion level of the wireless CDMA network;
      identify bit rates of links on the wireless CDMA network; and prioritize communications with links based upon the bit rates of the links such that the lower the low bit rate, the higher the priority.

19. The apparatus according to claim 13, further comprising a vocoder that encodes speech utterances into said sequence of packets.

20. The apparatus according to claim 13, wherein the initial buffer delay value comprises the initial transmission buffer delay value.

21. The apparatus according to claim 13, wherein the initial buffer delay value comprises the initial receive buffer delay value.

22. The apparatus according to claim 13, wherein the initial receive buffer delay value=a predetermined delay value−the initial transmission buffer delay value.

23. The apparatus according to claim 13, wherein the initial buffer delay value comprises an absolute time stamp that enables derivation of the initial receive buffer delay value.

24. A method of operating a Voice Over Internet Protocol (VOIP) transmitter device, comprising:
 buffering a plurality of packets in a transmission buffer, the transmission buffer having a transmission buffer delay;
 receiving a sequence of packets that encode a speech utterance using VOIP; and
 transmitting an initial buffer delay value along with a first packet in the sequence of packets that encode the speech utterance over a wireless network.

25. The method according to claim 24, wherein the wireless network comprises a Code Division Multiple Access (CDMA) wireless network.

26. The method according to claim 24, wherein the initial buffer delay value comprises the initial transmission buffer delay value.

27. The method according to claim 24, wherein the initial buffer delay value comprises the initial receive buffer delay value.

28. The method according to claim 24, wherein the initial buffer delay value comprises an absolute time stamp that enables derivation of the initial receive buffer delay value.

29. A Voice Over Internet Protocol (VOIP) receiver device, comprising:
 a receiver that receives a sequence of voice packets representing a speech utterance transmitted over a VOIP wireless interface;
 a receive packet buffer that buffers the received sequence of voice packets after receipt and before playback of reconstructed speech;
 means for reading an initial transmission buffer delay of a first packet in the sequence of packets representing the speech utterance; and
 means for setting a prescribed amount of delay in said receive packet buffer based upon the initial transmission buffer delay so that the initial transmission buffer delay+initial receive buffer delay=a predetermined total delay.

30. The apparatus according to claim 29, further comprising a transmitter that transmits the value of the initial transmission buffer delay.

31. The apparatus according to claim 29, wherein the receiver comprises a CDMA wireless receiver.

32. A Voice Over Internet Protocol (VOIP) receiver device, comprising:
 a receiver that receives a sequence of voice packets representing a speech utterance transmitted over a VOIP wireless interface;
 a receive packet buffer that buffers the received sequence of voice packets after receipt and before playback of reconstructed speech;
 means for reading an initial receive buffer delay of a first packet in the sequence of packets representing the speech utterance; and
 means for setting a prescribed amount of delay in said receive packet buffer=the initial receive buffer delay.

33. The apparatus according to claim 32, further comprising a transmitter that transmits the value of the initial receive buffer delay.

34. The apparatus according to claim 32, wherein the receiver comprises a CDMA wireless receiver.

35. A Voice Over Internet Protocol (VOIP) receiver device, comprising:
 a receiver that receives a sequence of voice packets representing a speech utterance transmitted over a VOIP wireless interface;
 a receive packet buffer that buffers the received sequence of voice packets after receipt and before playback of reconstructed speech;
 means for reading an absolute time stamp of a first packet in the sequence of packets representing the speech utterance; and
 means for setting a prescribed amount of delay in said receive packet buffer as a predetermined total delay value minus a transmit buffer delay, wherein the transmit buffer delay is derived from the absolute time stamp and a synchronized time reference.

36. The apparatus according to claim 35, further comprising a transmitter that transmits the absolute time stamp.

37. The apparatus according to claim 35, wherein the receiver comprises a CDMA wireless receiver.

38. A method of operating a Voice Over Internet Protocol (VOIP) receiver device, comprising:
 receiving a sequence of voice packets representing a speech utterance transmitted over a VOIP wireless interface;
 buffering the received sequence of voice packets after receipt and before playback of reconstructed speech;
 determining an initial receive buffer delay for the sequence of packets representing the speech utterance, wherein the determining comprises receiving information representing a transmit buffer delay along with the sequence of voice packets; and
 setting the initial receive buffer delay.

39. The method according to claim 38, wherein the determining comprises receiving an initial transmit buffer delay along with a first packet in said sequence of voice packets.

40. The method according to claim 38, wherein the determining comprises:
 receiving an initial transmission buffer delay value; and
 computing an initial receive buffer delay as a predetermined total delay−the initial transmission buffer delay=initial receive buffer delay.

41. The method according to claim 40, wherein the initial transmission buffer delay is read from the first packet in the sequence of packets.

42. The method according to claim 38, further comprising transmitting the value of the initial receive buffer delay.

43. The method according to claim 38, wherein the determining comprises:
 receiving an absolute time stamp; and
 computing an initial receive buffer delay based on the absolute time stamp and a synchronized time reference.

* * * * *